(12) United States Patent
Nara

(10) Patent No.: US 7,542,640 B2
(45) Date of Patent: Jun. 2, 2009

(54) ARRAYED WAVEGUIDE GRATING OPTICAL MULTIPLEXER/DEMULTIPLEXER

(75) Inventor: Kazutaka Nara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/056,892

(22) Filed: Mar. 27, 2008

(65) Prior Publication Data

US 2008/0253716 A1 Oct. 16, 2008

(30) Foreign Application Priority Data

Mar. 28, 2007 (JP) .............................. 2007-085165

(51) Int. Cl.
*G02B 6/34* (2006.01)
*G02B 6/28* (2006.01)

(52) U.S. Cl. ............................. 385/37; 385/14; 385/24

(58) Field of Classification Search ................... 385/14, 385/24, 37

See application file for complete search history.

(56) References Cited

U.S. PATENT DOCUMENTS

| | | | |
|---|---|---|---|
| 6,434,292 B1 * | 8/2002 | Kim et al. ................... | 385/24 |
| 6,442,314 B2 | 8/2002 | Nara et al. | |
| 6,456,763 B2 | 9/2002 | Kashihara et al. | |
| 6,490,395 B1 | 12/2002 | Nara et al. | |
| 6,501,882 B2 | 12/2002 | Kashihara et al. | |
| 6,501,896 B2 | 12/2002 | Nara et al. | |
| 6,504,983 B1 | 1/2003 | Nara et al. | |
| 6,539,158 B2 | 3/2003 | Kashihara et al. | |
| 6,563,986 B2 | 5/2003 | Kashihara et al. | |
| 6,567,587 B2 | 5/2003 | Kashihara et al. | |
| 6,591,044 B2 | 7/2003 | Kashihara et al. | |
| 6,631,235 B1 | 10/2003 | Kawashima et al. | |
| 6,668,116 B2 | 12/2003 | Kashihara et al. | |
| 6,671,433 B2 | 12/2003 | Kashihara et al. | |
| 6,678,446 B1 * | 1/2004 | McGreer et al. .............. | 385/37 |
| 6,728,435 B2 | 4/2004 | Kashihara et al. | |
| 6,735,364 B2 | 5/2004 | Kashihara et al. | |
| 6,763,164 B2 | 7/2004 | Kashihara et al. | |
| 6,768,832 B2 | 7/2004 | Nakajima et al. | |

(Continued)

OTHER PUBLICATIONS

Ikuo Ogawa, et al., "32ch Reconfigurable Optical Add Multiplexer Using Technique for Stacked Integration of Chip-Scale-Package PDs on Silica-Based PLC", ECOC 2006, Tu4. 4. 2, 2 pages.

(Continued)

*Primary Examiner*—Sung H Pak
*Assistant Examiner*—Daniel Petkovsek
(74) *Attorney, Agent, or Firm*—Oblon, Spivak, McClelland, Maier & Neustadt, P.C.

(57) ABSTRACT

An arrayed waveguide grating optical multiplexer/demultiplexer includes an arrayed waveguide grating formed on a substrate. The arrayed waveguide grating includes two slab waveguides, one arrayed waveguide, first input/output waveguides respectively connected to each end facet of slab waveguides, and second input/output waveguide-groups respectively connected to the end facets. The first input/output waveguides are provided for inputting or outputting a plurality of lights ($\lambda 1 \sim \lambda n$) each of which has a different wavelength and multiplexed. The second input/output waveguides are provided for individually inputting or outputting a plurality of lights ($\lambda 1 \sim \lambda n$). One arrayed waveguide 23 can be used to carry out simultaneously multiplexing and demultiplexing. It is able to carry out simultaneously multiplexing and demultiplexing with one arrayed waveguide grating.

2 Claims, 3 Drawing Sheets

U.S. PATENT DOCUMENTS

| | | |
|---|---|---|
| 6,768,840 B2 | 7/2004 | Nara et al. |
| 6,816,651 B2 | 11/2004 | Kashihara et al. |
| 6,829,418 B2 | 12/2004 | Kashihara et al. |
| 6,836,591 B2 | 12/2004 | Kashihara et al. |
| 6,842,560 B2 * | 1/2005 | Yamauchi et al. .............. 385/24 |
| 6,870,979 B2 | 3/2005 | Kawashima et al. |
| 6,920,265 B2 | 7/2005 | Kashihara et al. |
| 7,072,545 B2 | 7/2006 | Nara et al. |
| 7,133,587 B2 | 11/2006 | Nara et al. |
| 7,146,079 B2 | 12/2006 | Nara et al. |
| 7,233,714 B2 | 6/2007 | Kawashima et al. |
| 7,440,655 B2 * | 10/2008 | Grek et al. .................... 385/37 |
| 2002/0018622 A1 | 2/2002 | Nara et al. |
| 2002/0028300 A1 | 3/2002 | Komatsu et al. |
| 2002/0085808 A1 | 7/2002 | Ooyama et al. |
| 2002/0154861 A1 | 10/2002 | Nara et al. |
| 2002/0181857 A1 | 12/2002 | Komatsu et al. |
| 2003/0016928 A1 | 1/2003 | Nara et al. |
| 2003/0039043 A1 | 2/2003 | Nekado et al. |
| 2003/0048989 A1 | 3/2003 | Kashihara et al. |
| 2007/0104409 A1 | 5/2007 | Nara et al. |
| 2008/0031566 A1 | 2/2008 | Matsubara et al. |
| 2008/0131053 A1 | 6/2008 | Nara |

OTHER PUBLICATIONS

M. Abe, et al., Wavelength tuning in athermal silica-based arrayed waveguide grating multi/demultiplexer by UV irradiation, The Institute of Electronics, Information and Communication Engineers, Proceedings of the 2000 General Conference, p. 255.

* cited by examiner

ARRAYED WAVEGUIDE GRATING OPTICAL MULTIPLEXER/DEMULTIPLEXER

BACKGROUND OF THE INVENTION

1. Technical Field

The present invention relates to an arrayed waveguide grating optical multiplexer/demultiplexer having an arrayed waveguide grating formed on a planar lightwave circuit (PLC).

2. Related Arts

As a prior arrayed waveguide grating optical multiplexer/demultiplexer, the following techniques are known.

(1) A technique to fabricate individually a module (multiplexer) for multiplexing (MUX) having an arrayed waveguide (AWG) and a module (demultiplexer) for demultiplexing (DEMUX) having an arrayed waveguide (AWG).

(2) As disclosed in the following reference (1), a technique to integrate an arrayed waveguide grating for MUX and an arrayed waveguide grating for DEMUX on one chip.

Reference (1): I. Ogawa, et al., "32ch reconfigurable optical add multiplexer using technique for stacked integration of chip-scale-package PDs on silica-based PLC", ECOC 2006, Tu4.4.2

However, in the case of the above mentioned prior technique (1), at an optical node, it is necessary to install individually a multiplexing (MUX) module and a demultiplexing (DEMUX) module and to store individually the MUX module and the DEMUX module In the above prior technique (2) disclosed in the reference (1), since the arrayed waveguide grating for MUX and the arrayed waveguide grating for DEMUX are different, each center wavelength of the two arrayed waveguide gratings is slightly different due to the process error in manufacturing. Therefore, in the prior technique (2), it is required to fine adjust each center wavelength of the two arrayed waveguide gratings, by using a phase trimming technology disclosed in the following reference (2). For doing the fine adjustment by using the phase trimming technology, there was a problem that a large-scale device is needed.

Reference (2): J. Abe, et al., "Waveguide tuning in a thermal silica-based arrayed waveguide grating multi/demultiplexer by UV irradiation", The Institute of Electronics, Information and Communication Engineers, Proceedings of the 2000 General Conference, p 255.

BRIEF SUMMARY OF THE INVENTION

The present invention has an object to provide a low-cost and compact arrayed waveguide grating optical multiplexer/demultiplexer.

An arrayed waveguide grating optical multiplexer/demultiplexer according to a first aspect of the present invention comprises a substrate (10); and an arrayed waveguide grating (20) formed on a substrate (10), having two slab waveguides (21, 22), one arrayed waveguide (23), a first input/output waveguide (A) including at least one waveguide and a second input/output waveguide-group (C) including a plurality of waveguides, respectively connected to an end facet (21a) of one slab waveguide (21) of the two slab waveguides (21, 22); and a first input/output waveguide (B) including at least one waveguide and a second input/output waveguide-group (D) including a plurality of waveguides, respectively connected to an end facet (22a) of the other slab waveguide (22) of the two slab waveguides (21, 22).

According to the aspect, it is able to work simultaneously as multiplexing and demultiplexing. That is to say, in one usage, it works as demultiplexing (DEMUX) by passing lights from a first input/output waveguide (A) connected to the end facet (21a) of one slab waveguide (21) to a second waveguide-group (D) connected to the end facet (22a) of the other slab waveguide (22). In demultiplexing (DEMUX), an optical wavelength division multiplexed signal are divided into a plurality of lights each of which has a different wavelength. And, it also works as multiplexing (MUX) by passing lights from a second input/output waveguides (C) connected to the end facet (21a) of one slab waveguide (21) to a first input/output waveguide (B) connected to the end facet (22a) of the other slab waveguide (22). In multiplexing (MUX), a plurality of lights each of which has a different wavelength are multiplexed. In this way, it is possible to work simultaneously as multiplexing and demultiplexing.

In another usage, it works as demultiplexering (DEMUX), by passing lights from a first input/output waveguide (B) connected to the end facet (22a) to a second waveguide-group (C) connected to the end facet (21a). In demultiplexing (DEMUX), an optical wavelength division multiplexed signal are divided into a plurality of lights each of which has a different wavelength. And, it also work as multiplexing (MUX) by passing lights from a second input/output waveguides (D) connected to the other facet (22a) of the other slab waveguide (22) to a first input/output waveguide (A) connected to one end facet (21a) of one slab waveguide (12). In multiplexing (MUX), a plurality of lights each of which has a different wavelength are multiplexed. In this way, it is possible to work simultaneously as multiplexing and demultiplexing with one arrayed waveguide grating optical multiplexer/demultiplexer.

In this way, since it is able to work simultaneously as multiplexing and demultiplexing by using one arrayed waveguide grating optical multiplexer/demultiplexer having one arrayed waveguide grating, the following advantages are obtained.

In the above prior technique (1), at users' end such as an optical node, users have to install two modules for multiplexing and demultiplexing. On the contrary, according to the first aspect of the present invention, users just have to install one module (arrayed waveguide grating optical multiplexer/demultiplexer) for multiplexing and demultiplexing. Therefore, it is able to reduce the cost and a storing space for the arrayed waveguide grating optical multiplexer/demultiplexer by half, respectively.

In the technique to integrate an arrayed waveguide grating for MUX and an arrayed waveguide grating for DEMUX on one chip, such as the prior technique (2) disclosed in the above reference (1), it becomes larger size. On the contrary, according to the first aspect of the present invention, an arrayed waveguide grating optical multiplexer/demultiplexer is the same size as a prior multiplexing (MUX) module or demultiplexing (DEMUX) module, since one arrayed waveguide is used commonly for MUX and DEMUX.

In the method of the above prior technique (2), as described above, as it is required to fine adjust the center wavelength, by using a phase trimming technology, a large-scale device is needed. On the contrary, according to the first aspect of the present invention, there is no need for that kind of large-scale device and it is able to reduce the manufacturing cost.

In the arrayed waveguide grating optical multiplexer/demultiplexer according to a second aspect of the present invention, said first input/output waveguide (A) connected to the end facet (21a) of said one slab waveguides (21) is disposed between the second input/output waveguide-group (C) and a position where lights are output whose diffracted order are different from lights which are divided into every wavelength and coupled to each waveguide of the second input/output waveguide-group (C), in the case of which lights input from the first input/output waveguide (B) are output from the second input/output waveguide-group (C), and said first input/output waveguide (B) connected to the end facet (22a) of said one slab waveguides (22) is disposed between the second input/output waveguide-group (D) and a position where lights are output whose diffracted order are different from lights divided into every wavelength and coupled to each waveguide of the second input/output waveguide-group (D), in the case of which lights input from the first input/output waveguide (A) are output from the second input/output waveguide-group (D).

According to the aspect, there is no light (FSR light) whose diffracted order are different from the designed diffracted order of each light divided into every wavelength, in the region between the first input/output waveguide and the second waveguide-groups in each end facet (21a, 22a) of the two slab waveguides. Therefore, it is able to prevent the deterioration of light signals which is caused by the incidence of the FSR lights to the first input/output waveguide In the arrayed waveguide grating optical multiplexer/demultiplexer according to a third aspect of the present invention, said first input/output waveguide (A) and a center waveguide of the second input/output waveguide-group (C) are disposed at the same distance from a center line of said one slab waveguides (21), in the end facet (21a) of the one slab waveguides (21), and, said first input/output waveguide (B) and a center waveguide of the second input/output waveguide-group (D) are disposed at the same distance from a center line (22c) of said the other slab waveguides (22), in the end facet (22a) of the other slab waveguides (22).

According to the aspect, it is able to conform the center wavelength to the predetermined ITU grid and reduce the effect of process error in manufacturing, without changing the part of the arrayed waveguide.

According to the present invention, it is able to fabricate a low-cost and compact arrayed waveguide grating optical multiplexer/de multiplexer.

BRIEF DESCRIPTION OF THE DRAWINGS

The above and other objects and features of the invention will appear more fully hereinafter from a consideration of the following description taken into connection with the accompanying drawing wherein one example is illustrated by way of example, in which.

DETAILED DESCRIPTION OF THE INVENTION

An embodiment of the present invention will be described below.

Embodiment

Figure 1:
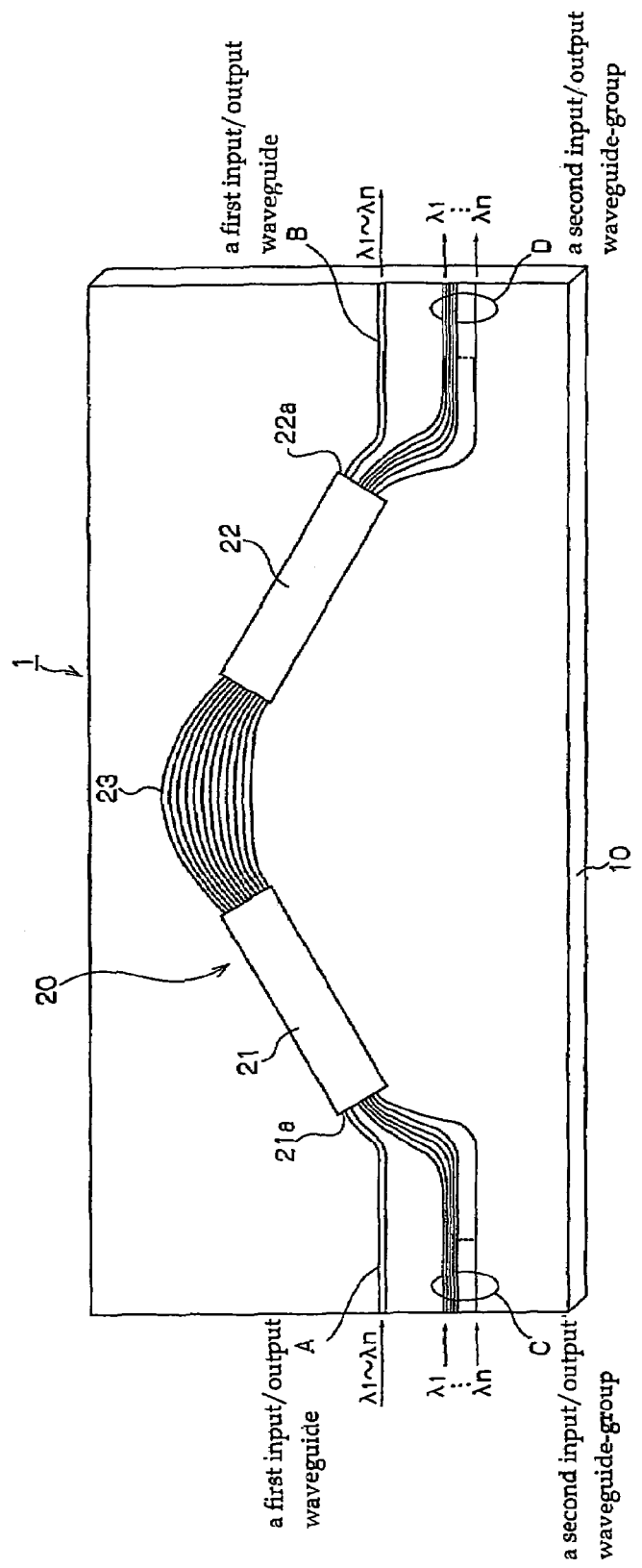
FIG. 1 is a schematic view showing an arrayed waveguide grating optical multiplexer/demultiplexer according to an embodiment of the present invention.
Figure 2:
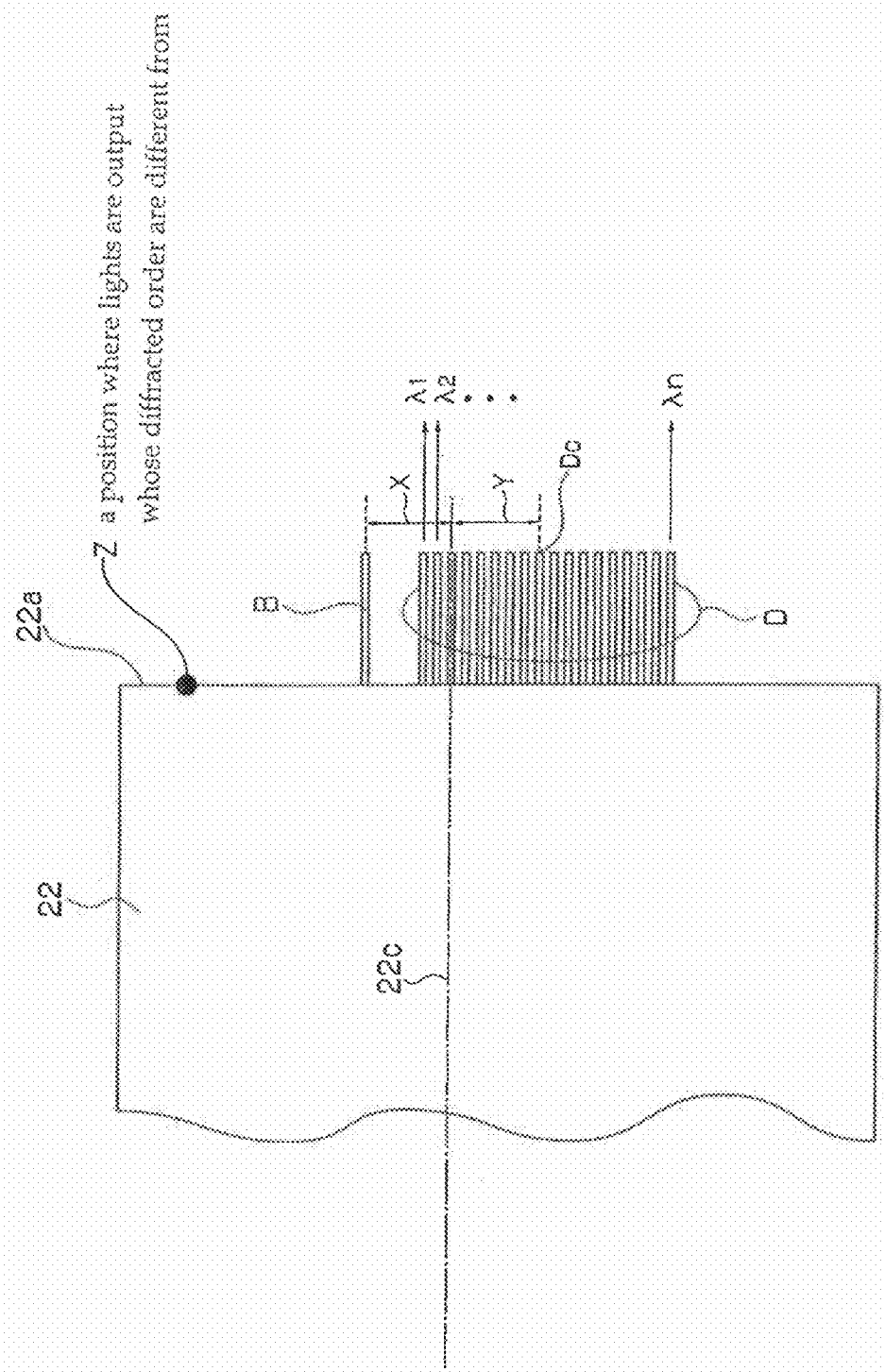
FIG. 2 is an enlarged plain view showing a part of a slab waveguide and input/output waveguides.

FIG. 1 is a schematic view showing an arrayed waveguide grating optical multiplexer/demultiplexer according to an embodiment of the present invention. FIG. 2 is an enlarged plain view showing a part of a slab waveguide and input/output waveguides.

As shown in FIG. 1, an arrayed waveguide grating optical multiplexer/demultiplexer 1 comprises an arrayed waveguide grating 20 formed on a substrate 10. The arrayed waveguide grating 20 is a planar lightwave circuit (PLC). The PLC is, for example, a silica based PLC in which a silica glass optical waveguide is formed using an optical fiber manufacturing technology combined with a semiconductor fine processing technology on a substrate 10, such as a silica substrate or a silicon substrate.

The arrayed waveguide grating 20 comprises two slab waveguides 21, 22 each of which is a broad multimode waveguide, one arrayed waveguide 23 which includes a number of single mode waveguides each of which has a different waveguide length and connected to between the two slab waveguides 21, 22 respectively. The arrayed waveguide grating 20 further comprises a first input/output waveguide A including at least one waveguide connected to an end facet 21a of one slab waveguide 21 of the two slab waveguides 21, 22, and a second input/output waveguides C including a number of waveguides connected to the end facet 21a. And, the arrayed waveguide grating 20 further comprises a first input/output waveguide B including at least one waveguide connected to an end facet 22a of the other slab waveguide 22 of the two slab waveguides 21, 22, and a second input/output waveguides D including a number of waveguides connected to the end facet 22a. That is to say, the first input/output waveguide A and the second input/output waveguides C are connected to the end facet 21a of one slab waveguide 21, and the first input/output waveguide B and the second input/output waveguides D are connected to the end facet 22a of one slab waveguide 22.

The arrayed waveguide grating optical multiplexer/demultiplexer 1 is characterized by following configurations.

The first input/output waveguide A and the second input/output waveguides C are connected to the end facet 21a of the slab waveguide 21, and the first input/output waveguide B and the second input/output waveguides D are connected to the end facet 22a of the slab waveguide 22. The first input/output waveguides A, B are provided for inputting or outputting a plurality of lights ($\lambda 1 \sim \lambda n$) each of which has a different wavelength and multiplexed. The second input/output waveguides C, D are provided for individually inputting or outputting a plurality of lights ($\lambda 1 \sim \lambda n$) each of which has a different wavelength.

One arrayed waveguide grating 20 is used to simultaneously carry out multiplexing (MUX) and demultiplexing (DEMUX).

The arrayed waveguide grating optical multiplexer/demultiplexer 1 is constructed to make it possible to simultaneously carry out multiplexing (MUX) and demultiplexing (DEMUX).

That is to say, in the arrayed waveguide grating optical multiplexer/demultiplexer 1, it works as demultiplexing (DEMUX) by passing lights from a first input/output waveguide A connected to the end facet 21a of one slab waveguide 21 to a second waveguide-group D connected to the end facet 22a of the other slab waveguide 22. In demultiplexing, an optical wavelength division multiplexed signal ($\lambda 1 \sim \lambda n$) is divided into a plurality of lights each of which has a different wavelength. The light which is inputted to the slab waveguide 21 from the first input/output waveguide A is diffracted in the slab waveguide 21 and couples to the arrayed waveguide 23. A phase difference depended on a wavelength causes at an edge of the arrayed waveguide 23, because the arrayed waveguide 23 has an optical path difference ΔL. The light focuses to the second input/output waveguide-group D in which the in-phase condition is satisfied by multi interference. Therefore, it works as DEMUX.

And, it works as multiplexing (MUX) by passing lights from a second input/output waveguides C connected to the end facet 21a of one slab waveguide 21 to a first input/output waveguide B connected to the end facet 22a of the other slab waveguide 22. In the multiplex, a plurality of lights (λ1~λn) each of which has a different wavelength are multiplexed.

And, it works as demultiplexing (DEMUX) by passing lights from a first input/output waveguide B connected to the end facet 22a of the other slab waveguide 22 to a second waveguide-group C connected to the end facet 21a of the one slab waveguide 21. In demultiplexing, an optical wavelength division multiplexed signal (λ1~λn) is divided into a plurality of lights each of which has a different wavelength. And, it works as multiplexing (MUX) by passing lights from a second input/output waveguides D connected to the end facet 22a of the other slab waveguide 22 to a first input/output waveguide A connected to the end facet 21a of one slab waveguide 21. In the multiplex, a plurality of lights (λ1~λn) each of which has a different wavelength are multiplexed.

In the arrayed waveguide grating optical multiplexer/demultiplexer 1, in the case of working as the above mentioned demultiplexing by passing lights from the first input/output waveguide A to the second waveguide-group D, lights (FSR lights: Free Spectral Range Lights) of the diffracted orders other than a designed diffracted order of the arrayed waveguide grating (AWG) 20 are simultaneously output. In this case, if the FSR lights focus to the first input/output waveguide B, there is a possibility that disadvantages are caused in the case of which multiplexing is carried out simultaneous with demultiplexing. That is to say, in the case of which it works as demultiplexing (DEMUX) by passing lights from the first input/output waveguide A to the second waveguide-group D, it is also able to work as multiplexing (MUX) by passing lights from the second input/output waveguide-group C to the first input/output waveguide B. In this case, if the FSR lights focus to the first input/output waveguide B, there is a possibility that the deterioration of the mulitiplexed optical light signals is caused.

In order to prevent the deterioration of the multiplexed optical light signals, as shown in FIG. 2, in the end facet 22a of the slab waveguide 22, the first input/output waveguide B is disposed between the second input/output waveguide-group D and a position Z where the FSR lights of the AWG 20 are output. The position Z is a position where the FSR light of a light (e.g, a light of wavelength λn) which is coupled to the waveguide most remote from the first input/output waveguide B in the second input/output waveguide-group D is output.

And, also in the case of working as demultiplexing by passing lights from the first input/output waveguide B to the second waveguide-group C, lights (FSR lights) whose diffracted order are different from the diffracted order of each light divided into every wavelength are simultaneously output. In this case, if the FSR lights focus to the first input/output waveguide A, there is a possibility that disadvantages are caused in the case of which multiplexing is carried out simultaneous with demultiplexing. That is to say, in the case of working as demultiplexing (DEMUX) by passing lights from the first input/output waveguide B to the second waveguide-group C, it is also able to work as multiplexing (MUX) by passing lights from the second input/output waveguide-group D to the first input/output waveguide A. In this case, if the FSR lights focus to the first input/output waveguide A, there is a possibility that the deterioration of the mulitiplexed optical light signals is caused. In order to prevent the deterioration of the mulitiplexed optical light signals, in the end facet 22a of the slab waveguide 22, the first input/output waveguide B is disposed between the second input/output waveguide-group D and a position Z where the FSR lights of the AWG 20 are output, as well as the end facet 22a shown in FIG. 2.

Further, in a prior arrayed waveguide grating (AWG), since an input waveguide is disposed on a center line, in the case of which the input waveguide is shifted from the center line, a predetermined optical path length difference of the AWG becomes different from a predetermined ITU Grid, in conforming the center wavelength to the ITU Grid. The ITU Grid is a frequency grid which is defined at 100 GHz (0.8 nm) intervals based on a frequency 193.1 THz (1,552.525 nm). Here, in order to reduce empirically the process error in manufacturing, it is important not to change the part of the arrayed waveguide grating 23 as possible. Therefore, in the arrayed waveguide grating optical multiplexer/demultiplexer 1, as shown in FIG. 2, the first input/output waveguide B and the second input/output waveguide-group D are disposed so that the distance X from a center line 22c to a center of the first input/output waveguide B corresponds to the distance Y from the center line 22c of the slab waveguide 22 to a center waveguide Dc of the second input/output waveguide-group D.

Further, in the arrayed waveguide grating optical multiplexer/demultiplexer 1, the first input/output waveguide A and the second input/output waveguide-group C is disposed as well as the positional relation of the first input/output waveguide B and the second input/output waveguide-group D.

EXAMPLE

As one example, we fabricated the arrayed waveguide grating (AWG) 20 of 100 GHz-16 ch. In the arrayed waveguide grating 20, FSR is 3200 GHz and a linear dispersion of the AWG is 20 μm. And, in the arrayed waveguide grating 20, the first input/output waveguides A, B have one waveguide respectively, the second input/output waveguide-group C, D have 16 waveguides respectively. Further, in the arrayed waveguide grating 20, a distance between the first input/output waveguide A and the second input/output waveguide-group C, and a distance between the first input/output waveguide B and the second input/output waveguide-group D has an interval of three waveguides, respectively. Here, the above distance X, Y (X=Y) is 100 μm. The measured results are shown in FIG. 3(A) and FIG. 3(B).

Figure 3:
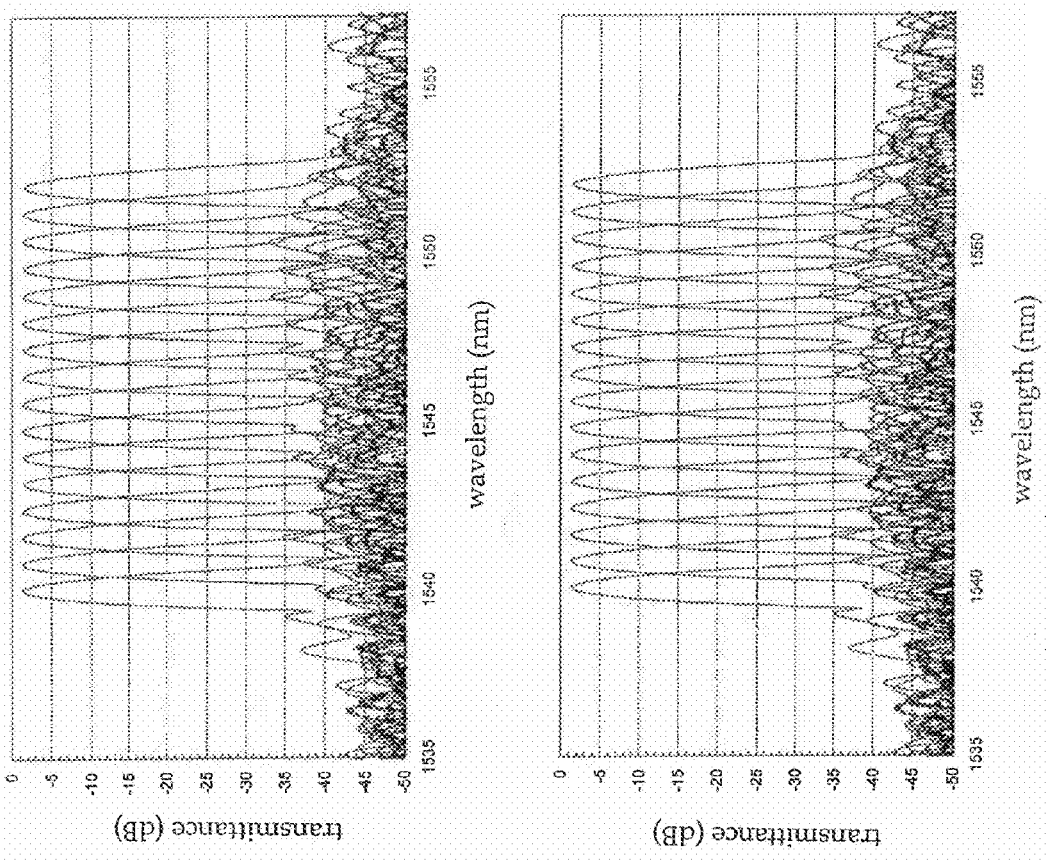
FIG. 3(A) is a graph showing a transmittance spectrum obtained in a first example of use in which multiplexing (MUX) and demultiplexing (DEMUX) are carried out simultaneously.
FIG. 3(B) is a graph showing a transmittance spectrum obtained in a second example of use in which a MUX and a DEMUX are carried out simultaneously.

FIG. 3(A) show the spectral characteristic which is obtained in the case (a first example of use) of that demultiplexing (DEMUX) is carried out by passing lights from the first input/output waveguide A to the second waveguide-group D and the multiplex is carried out by passing lights from the second input/output waveguides C to the first input/output waveguide B.

FIG. 3(B) show the spectral characteristic which is obtained in the case (a second example of use) of that demultiplexing (DEMUX) is carried out by passing lights from the first input/output waveguide B to the second waveguide-group C and the multiplex is carried out by passing lights from the second input/output waveguides D to the first input/output waveguide A.

It is able to understand that the same spectral characteristic is obtained with either example of the above first and second examples, from FIG. 3(A) and FIG. 3(B).

According to the embodiment having the above configuration, following functions and effects can be obtained.

It is possible to simultaneously carry out multiplexing and demultiplexing with one arrayed waveguide grating 20.

It is possible to simultaneously carry out multiplexing and demultiplexing with one arrayed waveguide grating optical multiplexer/demultiplexer 1 having one arrayed waveguide grating 20.

In the above prior technique (1), at users' end such as an optical node, users have to install two modules for multiplexing and demultiplexing On the contrary, according to the present example, users just have to install one (arrayed waveguide grating optical multiplexer/demultiplexer 1 for multiplexing and demultiplexing. Therefore, it is able to reduce the cost and a storing space for the arrayed waveguide grating optical multiplexer/demultiplexer 1 almost by half, respectively.

In the above prior technique (2) disclosed in the reference (1), since the arrayed waveguide grating for MUX and the arrayed waveguide grating for DEMUX are formed on one chip, the module size becomes big. On the contrary, according to the present example, since one arrayed waveguide grating 20 shares the arrayed waveguide grating for MUX and the arrayed waveguide grating for DEMUX, the size of arrayed waveguide grating 20 becomes the same with the prior module for MUX or DEMUX. Thereby, it is able to realize a compact arrayed waveguide grating optical multiplexer/demultiplexer 1.

In the method of the above prior technique (2), as described above, since it is required to fine adjust each center wavelength of the two arrayed waveguide gratings, by using a phase trimming technology, a large-scale device is needed. On the contrary, according to the present example, there is no need for that kind of large-scale device and it is able to reduce the manufacturing cost.

In the end facet 22a, the first input/output waveguide B is disposed between the second input/output waveguide-group D and the position Z where the FSR lights of the AWG 20 are output. And, also in the end facet 21a, the first input/output waveguide A is disposed between the second input/output waveguide-group C and a position where the FSR lights of the AWG 20 are output. Thereby, in each facet 21a, 22a of the two slab waveguides 21, 22, there is not any light (FSR light) whose diffracted order are different from the diffracted order of each light divided into every wavelength, in the region between the first input/output waveguides A, B and the second waveguide-groups C, D (between A and C, and between B and D). Therefore, since there is not any possibility that light (FSR light) whose diffracted order are different from the designed diffracted order of each light divided into every wavelength enters the first waveguide A, B, it is able to prevent the deterioration of the optical light signals. That is to say, in the above first example of use, since there is not any possibility that FSR light enters the first waveguide B. And, in the above second example of use, since there is not any possibility that FSR light enters the first waveguide A.

The first input/output waveguide B and the second input/output waveguide-group D are disposed so that the distance X from a center line 22c of the slab waveguide 22 to a center of the first input/output waveguide B corresponds to the distance Y from the center line 22c to a center waveguide Dc of the second input/output waveguide-group D. Further, the first input/output waveguide A and the second input/output waveguide-group C is disposed as well as the positional relation of the first input/output waveguide B and the second input/output waveguide-group D. Thereby, it is able to conform the center wavelength to the predetermined ITU grid and reduce the effect of process error in manufacturing, without changing the part of the arrayed waveguide.

The present invention is applicable also to an arrayed waveguide grating optical multiplexer/demultiplexer in which, in the aforementioned embodiment, the first input/output waveguide B and the second input/output waveguide-group D are interchanged so that the waveguide B and the waveguide-group D become to be line-symmetric with respect to the center line 22c. In this case, the first input/output waveguide A and the second input/output waveguide-group C will be also interchanged so that the waveguide A and the waveguide-group C become to be line-symmetric with respect to the center line of the slab waveguide 21 (referring to the center line 22c shown in FIG. 2).

In the aforementioned embodiment, it goes without saying that the arrayed waveguide grating optical multiplexer/demultiplexer 1 can be used only for multiplexing (MUX) or only for demultiplexing (DEMUX).

What is claimed is:

1. An arrayed waveguide grating optical multiplexer/demultiplexer comprising:
    a substrate; and
    an arrayed waveguide grating formed on said substrate, having
        two slab waveguides,
        one arrayed waveguide,
        a first input/output waveguide including at least one waveguide and a second input/output waveguide-group including a plurality of waveguides, respectively connected to an end facet of one slab waveguide of the two slab waveguides, and
        a first input/output waveguide including at least one waveguide and a second input/output waveguide-group including a plurality of waveguides, respectively connected to an end facet of the other slab waveguide of the two slab waveguides,
    wherein said first input/output waveguide connected to the end facet of said one slab waveguide is disposed between the second input/output waveguide-group connected to the end facet of said one slab waveguide and a position where lights are output whose diffracted order are different from lights which are divided into every wavelength and coupled to each waveguide of the second input/output waveguide-group connected to the end facet of said one slab waveguide, in the case of which lights input from the first input/output waveguide connected to the end facet of said other slab waveguide are output from the second input/output waveguide-group connected to the end facet of said one slab waveguide, and
    said first input/output waveguide connected to the end facet of said other slab waveguide is disposed between the second input/output waveguide-group connected to the end facet of said other slab waveguide and a position where lights are output whose diffracted order are different from lights which are divided into every wavelength and coupled to each waveguide of the second input/output waveguide-group connected to the end facet of said other slab waveguide, in the case of which lights input from the first input/output waveguide connected to the end facet of said one slab wave guide are output from the second input/output waveguide-group connected to the end facet of said other slab waveguide.

2. The arrayed waveguide grating optical multiplexer/demultiplexer according to claim 1, wherein said first input/output waveguide connected to the end facet of said one slab waveguide and a center waveguide of the second input/output waveguide-group connected to the end facet of said one slab waveguide are disposed at the same distance from a center line of said one slab waveguide, in the end facet of the one slab waveguide, and, said first input/output waveguide connected to the end facet of said other slab waveguide and a center waveguide of the second input/output waveguide-group connected to the end facet of said other slab waveguide are disposed at the same distance from a center line of said other slab waveguide, in the end facet of the other slab waveguide.

* * * * *